US010652372B2

(12) United States Patent
Wang et al.

(10) Patent No.: US 10,652,372 B2
(45) Date of Patent: May 12, 2020

(54) MIDDLE FRAME FOR MOBILE TERMINAL AND MOBILE TERMINAL

(71) Applicant: Huawei Technologies Co., Ltd., Shenzhen (CN)

(72) Inventors: Xi Wang, Beijing (CN); Jinfeng Zhou, Shenzhen (CN); Zhengquan Wang, Shenzhen (CN); Yukun Guo, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/343,299

(22) PCT Filed: Dec. 13, 2016

(86) PCT No.: PCT/CN2016/109731
§ 371 (c)(1),
(2) Date: Apr. 18, 2019

(87) PCT Pub. No.: WO2018/072285
PCT Pub. Date: Apr. 26, 2018

(65) Prior Publication Data
US 2019/0260861 A1    Aug. 22, 2019

(30) Foreign Application Priority Data
Oct. 18, 2016    (WO) ................ PCT/CN2016/102477

(51) Int. Cl.
*G06F 1/16*    (2006.01)
*H05K 5/00*    (2006.01)
(Continued)

(52) U.S. Cl.
CPC ..... *H04M 1/0249* (2013.01); *B29C 45/14467* (2013.01); *H04M 1/02* (2013.01);
(Continued)

(58) Field of Classification Search
CPC .... H04M 1/0249; H04M 1/02; H04M 1/0266; H04M 1/026; H04M 1/0277;
(Continued)

(56) References Cited

U.S. PATENT DOCUMENTS 7,688,574 B2 *   3/2010   Zadesky ............. H04M 1/0252
                                                                361/679.21
7,869,206 B2 *   1/2011   Dabov .................. G06F 1/1626
                                                                361/679.55
(Continued)

FOREIGN PATENT DOCUMENTS

CN    104967702 A    10/2015
CN    105162483 A    12/2015
(Continued)

OTHER PUBLICATIONS

Machine Translation and Abstract of Chinese Publication No. CN104967702, Oct. 7, 2015, 17 pages.
(Continued)

*Primary Examiner* — Anthony M Haughton
(74) *Attorney, Agent, or Firm* — Conley Rose, P.C.

(57) ABSTRACT

Embodiments include a middle frame for a mobile terminal and a mobile terminal. The middle frame for a mobile terminal includes a metal outer frame. An inner side of the metal outer frame is internally connected to a tray using a location structure. A plastic outer frame is formed on the inner side of the metal outer frame using an insert injection molding process, and the plastic outer frame is separately joined with the metal outer frame and the tray for curing.

20 Claims, 5 Drawing Sheets

(51) Int. Cl.
H05K 7/00 (2006.01)
H04M 1/02 (2006.01)
B29C 45/14 (2006.01)
H04M 1/00 (2006.01)

(52) U.S. Cl.
CPC ....... *H04M 1/0266* (2013.01); *H04M 1/0277* (2013.01); *B29C 45/14* (2013.01); *H04M 1/00* (2013.01)

(58) Field of Classification Search
CPC .... G06F 1/1613; G06F 1/1626; G06F 1/1633; G06F 1/1637
USPC .............. 361/679.55, 679.56, 679.21–679.3; 455/575.1–575.9
See application file for complete search history.

(56) References Cited

U.S. PATENT DOCUMENTS

| | | | | |
|---|---|---|---|---|
| 8,250,724 | B2* | 8/2012 | Dabov | G06F 1/1626 29/428 |
| 8,357,850 | B2* | 1/2013 | Ye | B29C 45/1657 174/50 |
| 8,462,517 | B2* | 6/2013 | Wojack | G06F 1/1626 361/728 |
| 2007/0293282 | A1* | 12/2007 | Lewis | H04M 1/0252 455/575.1 |
| 2008/0316117 | A1* | 12/2008 | Hill | H01Q 1/243 343/702 |
| 2009/0291709 | A1* | 11/2009 | Lee | G06F 1/1626 455/556.2 |
| 2011/0037662 | A1* | 2/2011 | Teng | H01Q 1/243 343/702 |
| 2011/0124246 | A1* | 5/2011 | Ouyang | H04M 1/0277 439/862 |
| 2014/0132456 | A1* | 5/2014 | Wang | H01Q 1/242 343/702 |
| 2019/0070760 | A1* | 3/2019 | Huang | B29C 45/14467 |

FOREIGN PATENT DOCUMENTS

| | | |
|---|---|---|
| CN | 205029702 U | 2/2016 |
| CN | 205071068 U | 3/2016 |
| CN | 205377956 U | 7/2016 |
| CN | 105904653 A | 8/2016 |
| CN | 105195745 B | 12/2017 |

OTHER PUBLICATIONS

Machine Translation and Abstract of Chinese Publication No. CN105162483, Dec. 16, 2015, 11 pages.
Machine Translation and Abstract of Chinese Publication No. CN105904653, Aug. 31, 2016, 10 pages.
Machine Translation and Abstract of Chinese Publication No. CN205029702, Feb. 10, 2016, 9 pages.
Machine Translation and Abstract of Chinese Publication No. CN205071068, Mar. 2, 2016, 9 pages.
Machine Translation and Abstract of Chinese Publication No. CN205377956, Jul. 6, 2016, 6 pages.
Foreign Communication From a Counterpart Application, PCT Application No. PCT/CN2016/109731, English Translation of International Search Report dated Jun. 26, 2017, 2 pages.
Foreign Communication From a Counterpart Application, PCT Application No. PCT/CN2016/109731, English Translation of Written Opinion dated Jun. 26, 2017, 4 pages.
Machine Translation and Abstract of Chinese Publication No. CN105195745, Dec. 26, 2017, 9 pages.

* cited by examiner

MIDDLE FRAME FOR MOBILE TERMINAL AND MOBILE TERMINAL

CROSS-REFERENCE TO RELATED APPLICATIONS

This application is a national stage of International Application No. PCT/CN2016/109731, filed on Dec. 13, 2016 , which claims priority to International Application No. PCT/CN2016/102477, filed on Oct. 18, 2016. Both of the aforementioned applications are hereby incorporated by reference in their entireties

TECHNICAL FIELD

Embodiments of the present invention relate to the technical field of mobile terminals, and in particular, to a middle frame for a mobile terminal and a mobile terminal.

BACKGROUND

Currently, a housing of a mobile terminal includes forms of an integrated housing structure and a structure of "a TP (touch panel)/an LCD (liquid crystal display)+a middle frame+a back cover". The housing structure of "a TP/an LCD+a middle frame+a back cover" greatly improves an aesthetic degree of the whole mobile terminal. Therefore, the housing structure is favored by more users. In addition, compared with a housing structure of the integrated housing structure type, in the housing structure of "a TP/an LCD+a middle frame+a back cover", different materials can be selected for the back cover according to an actual situation. This can reduce costs. However, in the housing structure of "a TP/an LCD+a middle frame+a back cover", the middle frame includes a metal outer frame of a frame structure, a tray that is internally connected to the metal outer frame and that is used to carry electronic parts and components, and a plastic outer frame disposed on an inner side of the metal outer frame. The metal outer frame is connected to the tray to form a middle board. A strength requirement of the middle board is relatively high. Therefore, in the prior art, the metal outer frame and the tray are connected together mainly in two manners: integrating, and fastening and connecting.

A main processing manner of integrating the tray and the metal outer frame includes numerical control machine processing and integrated die-casting. However, even though the numerical control machine processing has very high continuous workability, a high yield rate, relatively small space required by design, and a relatively exquisite appearance of a finished product, costs of the numerical control machine processing are excessively high. This does not help in controlling production costs. Even though costs of the processing manner of the integrated die-casting are relatively low, exterior parts of most of produced products have a severe disadvantage such as a hole or a flow mark, and a product qualification ratio is excessively low.

A main processing manner of fastening and connecting the tray and the metal outer frame includes point soldering, screw connection, bimetallic die-casting, and the like. The point soldering manner is to connect the tray and the metal outer frame through point soldering by using soldering tin. This solution does not affect an appearance structure of the middle frame. However, connection strength of the point soldering manner is relatively low, and product reliability is excessively low. When the tray is connected to the metal outer frame by using a screw, connection strength is high, product reliability is relatively desirable, and an appearance is relatively exquisite. However, a requirement on a size of a to-be-connected part is relatively high during the screw connection, and an external dimension of the mobile terminal is increased. This does not facilitate a miniaturization, lightening, and thinning design of the mobile terminal. The bimetallic die-casting solution has relatively high continuous workability, a relatively high yield rate, and relatively large space required by design. However, an appearance of a finished product has a flaw, and secondary processing is required. This requires more processes and increases costs.

SUMMARY

Embodiments of the present invention provide a middle frame for a mobile terminal and a mobile terminal, so as to implement a middle frame having low costs and high reliability.

To achieve the foregoing objective, according to a first aspect, an embodiment of the present invention provides a middle frame for a mobile terminal. The middle frame includes a metal outer frame, a tray, and a plastic outer frame. An inner side of the metal outer frame is internally connected to the tray by using a location structure, and the plastic outer frame is separately joined with the metal outer frame and the tray for curing. The plastic outer frame is located on the inner side of the metal outer frame, and the plastic outer frame is formed by using an injection molding process. The metal outer frame is connected to the tray by using the location structure, so that manufacturing costs of the middle board are relatively low in addition, a requirement of the location structure on a space design of the middle frame is not high, and production costs are low.

With reference to the first aspect, in a first possible implementation, a protrusion is disposed on the inner side of the metal outer frame, the protrusion extends to a middle portion of the metal outer frame, an edge of the tray and the protrusion are disposed in a superposition manner, and the edge of the tray is connected to the protrusion by using the location structure. The tray and the protrusion are disposed in a superposition manner, so that the protrusion plays a supporting role on the tray. Therefore, the connection is more stable.

With reference to the first possible implementation of the first aspect, in a second possible implementation, the plastic outer frame clamps the tray and the protrusion along a direction of superposition between the tray and the protrusion. This can further increase contact areas respectively between the plastic outer frame and the tray and between the plastic outer frame and the metal outer frame, so that the connection is more reliable.

With reference to the first possible implementation of the first aspect, in a third possible implementation, a plane on which the protrusion is located is perpendicular to an inner surface of the metal outer frame. This helps a skilled person properly arrange electronic parts and components.

With reference to any possible implementation of the first aspect, in a fourth possible implementation, the location structure is a clamping structure, the clamping structure includes a first clamping structure and a second clamping structure that are clamped in a cooperative manner, the first clamping structure is disposed on the tray, and the second clamping structure corresponding to the first clamping structure is disposed on the metal outer frame. The clamping structure can reduce time for connection between the metal outer frame and the tray to a great extent, so as to shorten production time of the outer frame.

With reference to the first possible implementation of the first aspect, in a fifth possible implementation, the location structure is a clamping structure, the clamping structure includes a first clamping structure and a second clamping structure that are clamped in a cooperative manner, the first clamping structure is disposed on an edge of a side surface of the tray, and the second clamping structure is correspondingly disposed on the protrusion of the metal outer frame.

With reference to the fourth or the fifth possible implementations of the first aspect, in a sixth possible implementation, the first clamping structure is disposed as a rivet platform, and the second clamping structure is correspondingly disposed as a rivet hole that can be riveted to the rivet platform in a cooperative manner; or the first clamping structure is disposed as a rivet hole, and the second clamping structure is disposed as a rivet platform that can be riveted to the rivet platform in a cooperative manner. When the metal outer frame is clamped to the tray, the rivet platform is riveted to the rivet hole in a cooperative manner, so as to internally connect the tray to the metal outer frame.

With reference to the sixth possible implementation of the first aspect, in a seventh possible implementation, when the rivet platform is disposed on the metal outer frame, a contact area of a joint between the rivet platform and the metal outer frame is greater than or equal to 1 mm$^2$, or when the rivet platform is disposed on the tray, a contact area of a joint between the rivet platform and the tray is greater than or equal to 1 mm$^2$. In this case, after the middle frame is hit by external force or is used for a long time, the rivet platform does not fall off from the metal outer frame or the tray, thereby ensuring reliability of the middle frame.

With reference to any one of the fourth to the seventh possible implementations of the first aspect, in an eighth possible implementation, there are a plurality of first clamping structures, and the plurality of first clamping structures are all disposed on an edge of one side surface of the tray; and a plurality of second clamping structures are disposed at positions that are corresponding to the plurality of first clamping structures and that are on the metal outer frame. The plurality of first clamping structures are clamped to the plurality of second clamping structures one to one in a cooperative manner. This increases location strength between the metal outer frame and the tray.

With reference to the eighth possible implementation of the first aspect, in a ninth possible implementation, a spacing is provided between any two adjacent first clamping structures of the plurality of first clamping structures, and a value range of the spacing between the any two adjacent first clamping structures is from 10 mm to 50 mm. In this way, the location strength between the metal outer frame and the tray can be ensured to avoid mutual dislocation between the metal outer frame and the tray. In addition, a quantity of location structures can be effectively reduced, and a mass of the middle frame is reduced to an extent, thereby facilitating implementation of lightening and thinning of the mobile terminal.

With reference to the first aspect or any one of the foregoing possible implementations, in a tenth possible implementation, the metal outer frame includes a signal receiving portion and an appearance portion, and the signal receiving portion is insulatively connected to the appearance portion by using joining force generated when joining and curing are performed for the plastic outer frame. A signal received by the signal receiving portion is not transferred to the appearance portion. Therefore, a communication function of the mobile terminal is not affected.

According to a second aspect, an embodiment of the present invention provides a mobile terminal, including the middle frame described above, where a circuit board is mounted on a tray of the middle frame, and two sides are respectively connected to a display apparatus and a back cover. Production costs of the mobile terminal are relatively low, reliability of the middle frame is relatively high, and lightening and thinning of the mobile terminal device can be implemented.

According to a third aspect, an embodiment of the present invention provides a method for producing a middle frame for a mobile terminal, including the following steps:

S1. A location structure internally connects a tray to a metal outer frame to form an insert.

S2. Place the formed insert in an injection molding mold, and form a plastic outer frame on an inner surface of the metal outer frame by using an insert injection molding process, so that the plastic outer frame is separately joined with the metal outer frame and the tray for curing.

During production of the middle frame for the mobile terminal, a middle frame, which has relatively high reliability, for the mobile terminal can be produced. In addition, operations of the process are simple, and continuous production can be performed, implementing quantity production on the middle frame for the mobile terminal.

With reference to the third aspect, in a first possible implementation of the third aspect, before step S2, the method further includes the following step: S2'. Perform nanocrystallization processing on the inner surface of the metal outer frame, so that a plurality of small holes are formed on the inner surface of the metal outer frame. This increases a connection area between the plastic outer frame and the metal outer frame, so that connection between the metal outer frame and the plastic outer frame is closer, and no structure disconnection occurs.

With reference to the third aspect, in a second possible implementation of the third aspect, after step S2, the method further includes the following step: S3. Process appearance surfaces of the metal outer frame and the plastic outer frame in a manner of anodizing, spraying, or electrophoresis.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Figure 1:
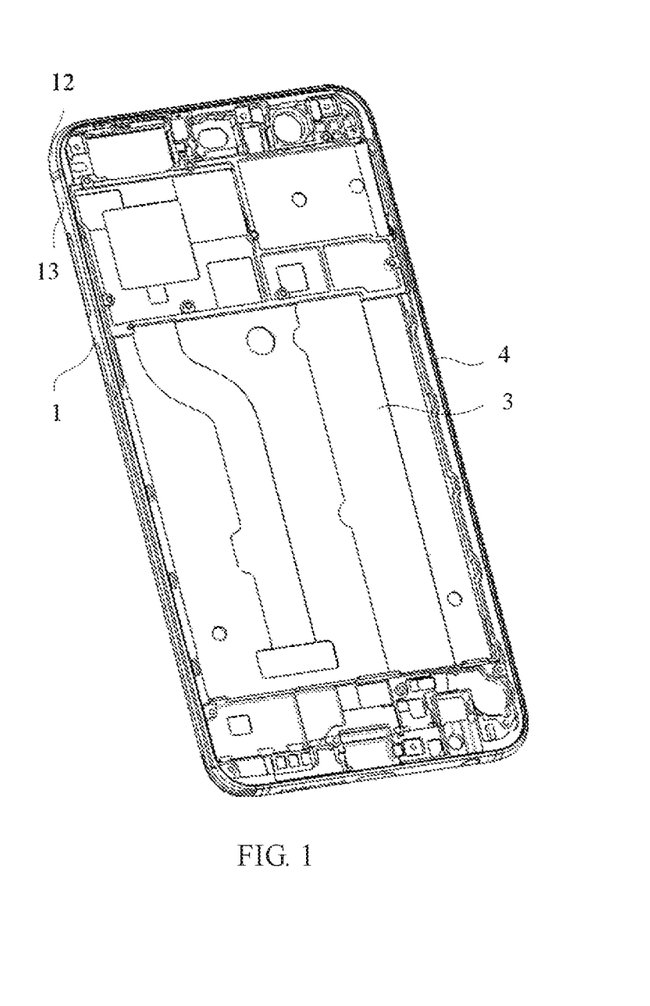
FIG. 1 is a schematic structural diagram of a middle frame for a mobile terminal according to an embodiment of the present invention.
Figure 2:
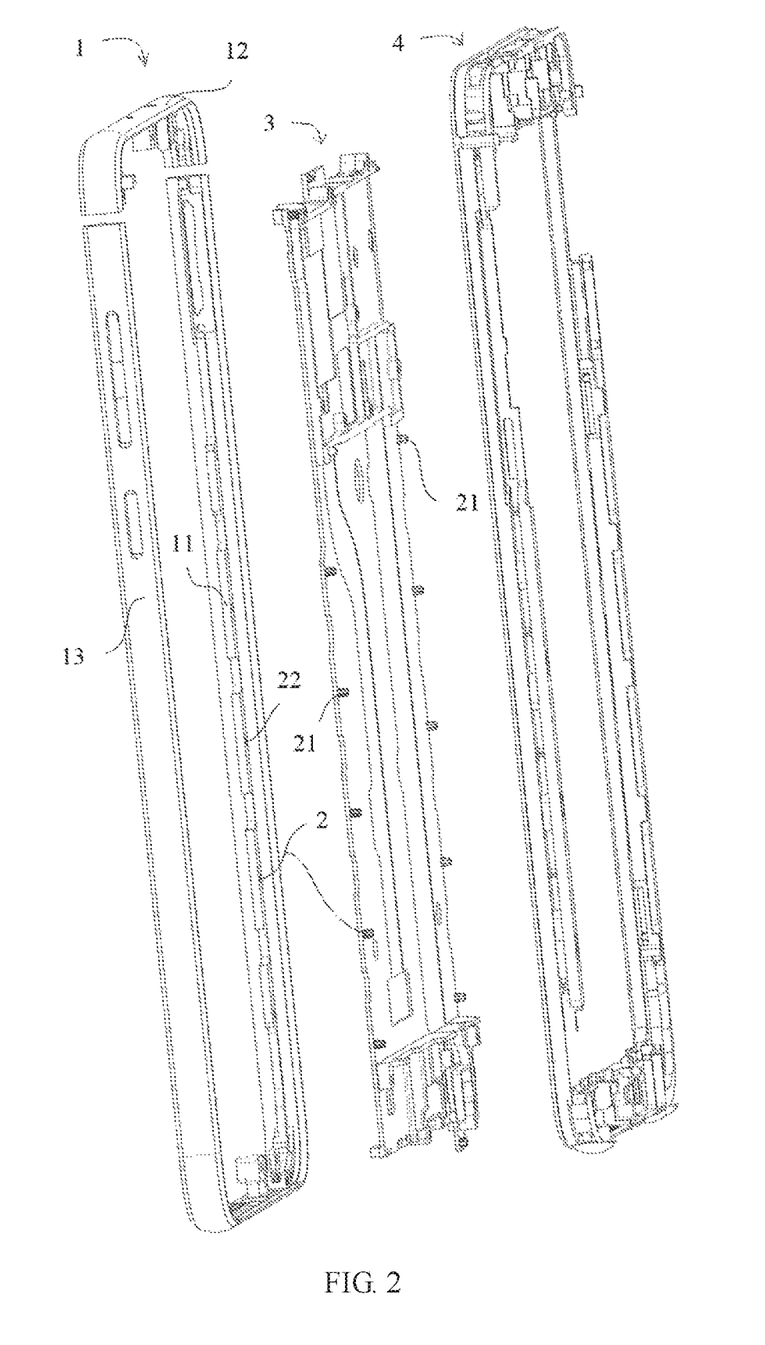
FIG. 2 is an exploded diagram of a middle frame for a mobile terminal according to an embodiment of the present invention.

A system architecture of a middle frame for a mobile terminal provided in an embodiment of the present invention is shown in FIG. 1 and FIG. 2. The middle frame includes a metal outer frame 1. An inner side of the metal outer frame 1 is internally connected to a tray 3 by using a location structure 2. A plastic outer frame 4 is formed on the inner side of the metal outer frame 1 by using an insert injection molding process. The plastic outer frame 4 is separately joined with the metal outer frame 1 and the tray 3 for curing.

Compared with the prior art, in the middle frame provided in this embodiment of the present invention, the metal outer frame 1 is a frame structure, and the tray 3 is in a plate-shape structure. When the middle frame is being assembled, the tray 3 is internally connected, by using the location structure 2, in space surrounded by the metal outer frame 1. In addition, the plastic outer frame 4 is formed on the inner side of the metal outer frame 1 by using the insert injection molding process. The tray 3 is connected to the metal outer frame 1 by using the location structure 2. Therefore, during injection molding and forming of the plastic outer frame 4, no relative dislocation between the tray 3 and the metal outer frame 1 occurs. The insert injection molding process is: After a prepared heterogeneous material insert (that is, in the present invention, the metal outer frame 1 and the tray 3 that are connected by using the location structure 2) is placed in a mold, plastic in a molten state is injected into the mold, and the plastic in a molten state generates joining force during solidification and forming, Therefore, the plastic outer frame 4 is joined together with the metal outer frame 1 and the tray 3 during curing. That is, the plastic outer frame 4 is joined together with the metal outer frame 1 and the tray 3 for curing, so that the metal outer frame 1, the tray 3. and the plastic outer frame 4 are firmly secured and connected together, so that the middle frame for the mobile terminal has relatively high reliability. The metal outer frame 1 is connected to the tray 3 by using the location structure 2, so that manufacturing costs of a middle board are relatively low. In addition, a requirement of space design of the location structure 2 on the middle frame is not high. Therefore, this does not lead to an increase in an external dimension of the mobile terminal, facilitating implementation of miniaturization, lightening, and thinning of the mobile terminal. Further, because a production process is relatively simple, the middle frame for the mobile terminal can be continuously produced, so as to implement quantity production. This reduces production costs of the middle frame for the mobile terminal to an extent.

Figure 3:
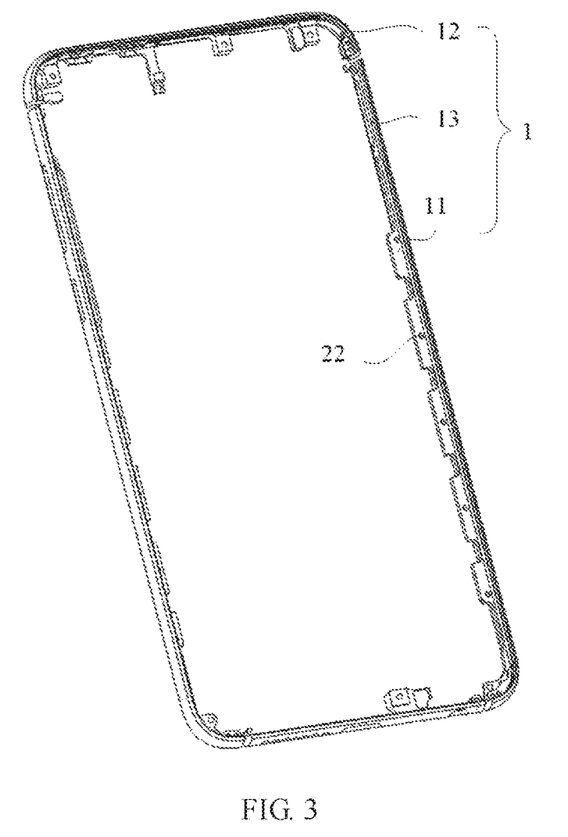
FIG. 3 is a schematic structural diagram of a metal outer frame of a middle frame for a mobile terminal according to an embodiment of the present invention.

To make the connection between the metal outer frame 1 and the tray 3 more stable, as shown in FIG. 2 and FIG. 3, a protrusion 11 is disposed on the inner side of the metal outer frame 1, the protrusion 11 extends to a middle portion (a hollow location in the middle) of the metal outer frame 1, an edge of the tray 3 and the protrusion 11 are disposed in a superposition manner, and the edge of the tray 3 is connected to the protrusion 11 by using the location structure 2. After the location structure 2 connects the protrusion 11 and the tray 3, if the protrusion 11 and the tray 3 are in a superposition state, and the tray 3 does not exceed a thickness range of the metal outer frame 1. Therefore, this does not lead to an increase in a thickness of the middle frame, and ensures lightening and thinning of the mobile terminal. In addition, the protrusion 11 can play a supporting role on the tray 3, so that it is not easy for the tray 3 to fall off from the protrusion 11, and the connection is more stable.

Figure 5:
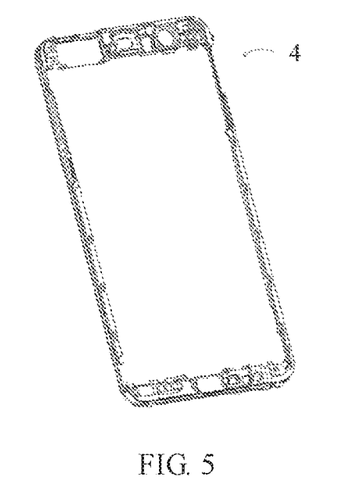
FIG. 5 is a schematic structural diagram of a plastic outer frame of a middle frame for a mobile terminal according to an embodiment of the present invention.
Figure 6:
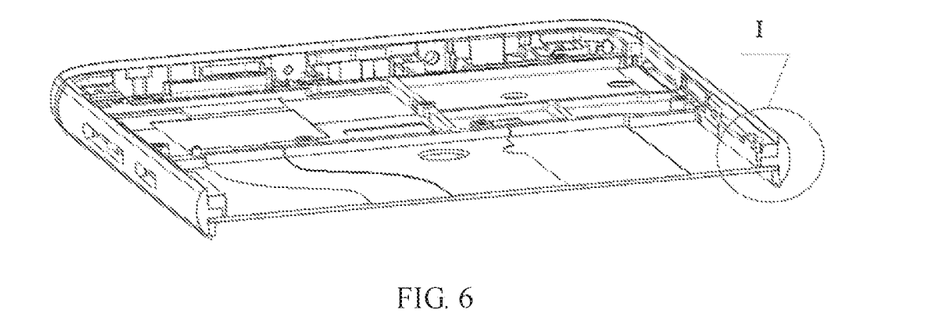
FIG. 6 is a schematic sectional diagram of a middle frame for a mobile terminal according to an embodiment of the present invention.
Figure 7:
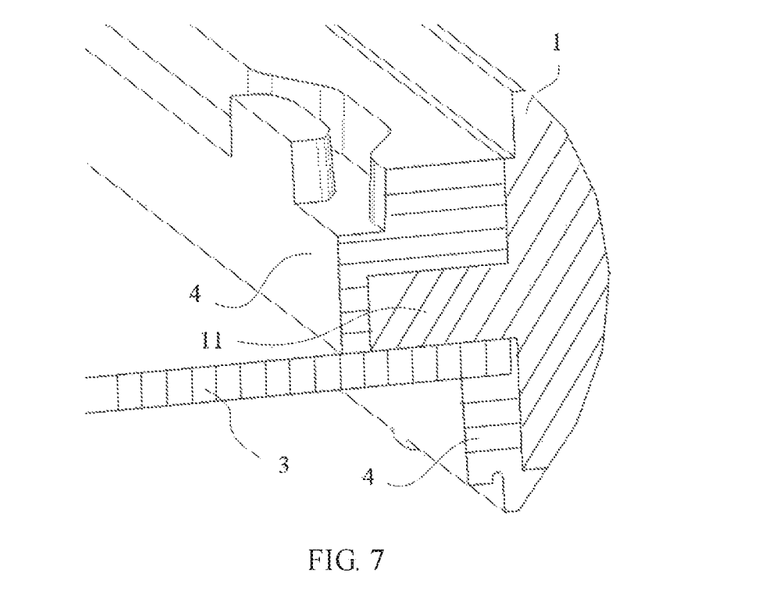
FIG. 7 is an enlarged diagram of a portion I of FIG. 6.

Specifically, as shown in FIG. 5 to FIG. 7, the plastic outer frame 4 clamps the tray 3 and the protrusion 11 along a direction of superposition between the tray 3 and the protrusion 11. The plastic outer frame 4 clamps the tray 3 and the protrusion 11 along a direction of superposition between the tray 3 and the protrusion 1, so as to form a sandwich structure of "plastic+a middle board+plastic" (the middle board is a combined structure formed after the metal outer frame 1 is connected to the tray 3). This can further separately increase a contact area between the plastic outer frame 4 and the tray 3 and a contact area between the plastic outer frame 4 and the metal outer frame 1, so that connection between the plastic outer frame 4 and the tray 3 and connection between the plastic outer frame 4 and the metal outer frame 1 are more reliable. In addition, the plastic outer frame 4 clamps the tray 3 and the protrusion 11, so that a relative location between the tray 3 and the metal outer frame 1 is limited, so as to ensure a yield rate of the middle frame.

It should be noted that, as shown in FIG. 3, a plane on which the protrusion 11 is located is perpendicular to an inner surface of the metal outer frame 1. After the tray 3 is mounted on the protrusion 11, if an included angle between the tray 3 and the inner surface of the metal outer frame 1 is an acute angle, when the mobile terminal is horizontally placed, an angle between the tray 3 and a horizontal plane is not 0°. In this case, a distance between an end surface that is on the metal outer frame 1 and that is perpendicular to the inner surface and one side surface of the tray 3 is inconstant. Therefore, when a designer designs electronic parts and components, a mounting location can be designed only according to heights of the electronic parts and components. This does not facilitate proper layout of the electronic parts and components. Therefore, when the included angle between the tray 3 and the inner surface of the metal outer frame 1 is a right angle, the end surface that is on the metal outer frame 1 and that is perpendicular to the inner surface is parallel to the tray 3. Therefore, when the mobile terminal is horizontally placed, the tray 3 is parallel to the horizontal plane. Therefore, a vertical height from any point on one side surface of the tray 3 to the end surface of the metal outer frame 1 is equal. Compared with the solution in which the included angle between the tray 3 and the inner surface of the metal outer frame 1 is an acute angle, the plane on which the protrusion 11 is located is disposed to be perpendicular to the inner surface of the metal outer frame 1, thereby further helping a skilled person properly arrange the electronic parts and components.

Optionally, the location structure 2 is a clamping structure, and includes a first clamping structure 21 disposed on the tray 3, and a second clamping structure 22 correspondingly disposed on the metal outer frame 1. The first clamping structure 21 can be clamped to the second clamping structure 22 in a cooperative manner. The clamping structure is easy to mount, and can reduce time for connection between the metal outer frame 1 and the tray 3 to a great extent, so as to shorten production time of the outer frame.

Optionally, the location structure 2 is a clamping structure, and includes a first clamping structure 21 disposed on an edge of one side surface of the tray 3. and a second clamping structure 22 correspondingly disposed on the protrusion 11. The first clamping structure 21 is clamped to the second clamping structure 22 in a cooperative manner. When the second clamping structure 22 is disposed on the protrusion 11, the tray 3 and the protrusion 11 can be connected together when the tray 3 and the protrusion 11 are disposed in a superposition manner, and the tray 3 can be directly located and mounted in the metal outer frame 1. This reduces time for connection between the metal outer frame 1 and the tray 3 to a great extent, so as to shorten production time of the outer frame.

It should be noted that when location needs to be performed for the tray 3 and the metal outer frame 1, a manner of bonding the tray 3 and the metal outer frame 1 together by using an adhesive may be further used. When location is performed for the tray 3 and the metal outer frame 1 by using the adhesive, the location for the tray 3 and the metal outer frame 1 is relatively easy and is relatively reliable. However, because connection performed by using the adhesive is relatively reliable, during bonding, the tray 3 needs to be aligned with the metal outer frame 1, to avoid a location failure caused by dislocation occurring during bonding.

Specifically, as shown in FIG. 2, the first clamping structure 21 is a rivet platform, and the second clamping structure 22 is a rivet hole; or the first clamping structure 21 is a rivet hole, and the second clamping structure 22 is a rivet platform. The first clamping structure 21 is one of the rivet platform or the rivet hole, and the second clamping structure 22 is the other one of the rivet platform or the rivet hole. When the metal outer frame 1 is clamped to the tray 3, the rivet platform extends into the rivet hole to perform interference fit to a hole wall of the rivet hole, so as to internally connect the tray 3 to the metal outer frame 1. In addition, in a location manner in which the metal outer frame 1 and the tray 3 are clamped by riveting the rivet platform to the rivet hole in a cooperative manner, a structure is simple and costs are low. Compared with a solution of integrating the metal outer frame 1 and the tray 3, the metal outer frame 1 and the tray 3 can be separately formed in the riveting solution. This reduces a process difficulty, thereby reducing the production costs, and improving production efficiency. Compared with a solution in which the metal outer frame 1 is connected to the tray 3 by using a screw, reserved space does not need to be designed during riveting. This can reduce a thickness of the middle frame, so as to save materials, reduce the costs, and implement lightening and thinning of the mobile terminal. Compared with a point soldering solution, production efficiency is relatively high during riveting and reliability is high, and it is not easy for the metal outer frame 1 to fall off from the tray 3. Compared with a bimetallic die-casting solution, it is not easy for the metal outer frame 1 and the tray 3 to deform during riveting, thereby ensuring a yield rate of a finished product.

To properly design connection strength of the rivet platform, when the rivet platform is disposed on the metal outer frame 1, a contact area between the rivet platform and the metal outer frame 1 is greater than or equal to 1 mm$^2$; or when the rivet platform is disposed on the tray 3, a contact area between the rivet platform and the tray 3 is greater than or equal to 1 mm$^2$. When the rivet platform is disposed on the metal outer frame 1, if the contact area between the rivet platform and the metal outer frame 1 is less than 1 mm$^2$, the rivet platform falls off from the metal outer frame 1 after a produced middle frame is hit by external force during use or is used for a long time. Consequently, the middle frame forms a weak spot, and this reduces reliability of the middle frame. Therefore, to ensure the connection strength between the rivet platform and the metal outer frame 1, the contact area between the rivet platform and the metal outer frame 1 is greater than or equal to 1 mm$^2$. In this case, after the middle frame 1 is hit by external force or is used for a long time, the rivet platform does not fall off from the metal outer frame 1, thereby ensuring the reliability of the middle frame. Likewise, when the rivet platform is disposed on the tray 3, to ensure the reliability of the middle frame, the contact area between the rivet platform and the tray 3 is greater than or equal to 1 mm$^2$, so that it is not easy for the rivet platform to fall off from the tray 3.

It should be noted that, the rivet platform may be in a cylindrical structure, a prism structure, or the like. Correspondingly, the rivet hole is a round hole or a polygonal hole that can he riveted to the rivet platform in a cooperative manner. This is not limited in the present invention.

Figure 4:
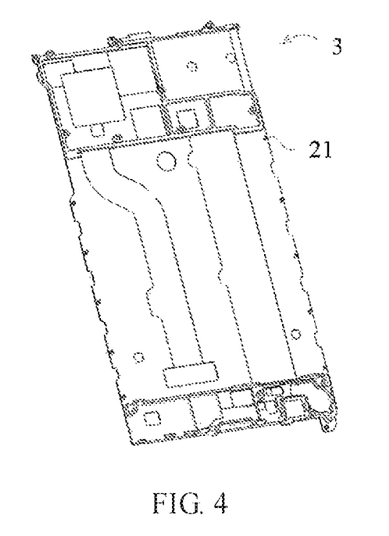
FIG. 4 is a schematic structural diagram of a tray of a middle frame for a mobile terminal according to an embodiment of the present invention.

To enhance location strength between the metal outer frame 1 and the tray 3, as shown in FIG. 2 to FIG. 4, a plurality of first clamping structures 21 are disposed on an edge of one side surface of the tray 3, and a plurality of second clamping structure 22 corresponding to the plurality of first clamping structures 21 are disposed on the metal outer frame 1. The plurality of first clamping structures 21 are clamped to the plurality of second clamping structures 22 one to one in a cooperative manner. This can increase the location strength between the metal outer frame 1 and the tray 3.

Optionally, the plurality of first clamping structures 21 are disposed at intervals, and a range of a spacing between two adjacent first clamping structures 21 is from 10 mm to 50 mm. When the spacing between the two first clamping structures 21 is less than 10 mm, location structures 2 on the middle frame for the mobile terminal are distributed excessively densely. Even though the location strength between the metal outer frame 1 and the tray 3 can be ensured, the excessive location structures 2 lead to an increase in a mass of the middle frame. This does not facilitate implementation of lightening and thinning of the mobile terminal. However, if the spacing between the two adjacent first clamping structures 21 is greater than 50 mm, the location strength between the metal outer frame 1 and the tray 3 cannot be ensured. This easily leads to mutual dislocation between the metal outer frame 1 and the tray 3, and does not facilitate production of the middle frame. Therefore, when a value range of the spacing between the two adjacent first clamping structures 21 is from 10 mm to 50 mm, the location strength between the metal outer frame 1 and the tray 3 can be ensured to avoid mutual dislocation between the metal outer frame 1 and the tray 3. In addition, a quantity of location structures 2 can be effectively reduced, and the mass of the middle frame is reduced to an extent, so as to facilitate implementation of lightening and thinning of the mobile terminal.

Optionally, as shown in FIG. 2 and FIG. 3, a plurality of protrusions 11 are disposed on the metal outer frame 1, and one second clamping structure 22 is disposed on each protrusion 11. Compared with a solution in which a ring protrusion is disposed on the inner side of the metal outer frame 1, in a solution in which a plurality of protrusions 11 are disposed, during injection molding and forming of the plastic outer frame 4, plastic in a molten state flows more easily to two surfaces, that are, an upper surface and a lower surface of the tray 3. Therefore, the plastic outer frame 4 for which joining and curing have been performed can play a clamping role on the tray 3, so that the reliability of the middle frame is higher. In addition, the plurality of protrusions 11 are disposed in a one-to-one correspondence with the plurality of second clamping structures 22. Therefore, a total volume of the protrusions 11 can be reduced, and the mass of the middle frame is reduced to an extent, thereby facilitating implementation of lightening and thinning of the mobile terminal.

Because a metal material has a relatively desirable conduction role, the mobile terminal mostly uses the metal material to manufacture a signal receiving portion. Because the middle frame for the mobile terminal includes the metal outer frame 1 of the metal material, the mobile terminal integrates the signal receiving portion with the metal outer frame 1, so as to implement miniaturization of a device. As shown in FIG. 3, the metal outer frame 1 includes a signal receiving portion 12 and an appearance portion 13, and during joining and curing for the plastic outer frame 4, the signal receiving portion 12 is insulatively connected to the appearance portion 13. The signal receiving portion 12 of the metal outer frame 1 is used to receive a signal, so that the mobile terminal implements a communication function. However, if the signal receiving portion 12 is directly connected to the appearance portion 13, a signal is grounded, affecting the communication function of the mobile terminal. Therefore, there is a gap between the signal receiving portion 12 and the appearance portion 13, the plastic outer frame 4 is filled in the gap during injection molding and forming, and the signal receiving portion 12 is connected to the appearance portion 13. Because plastic is an insulating material, the signal received by the signal receiving portion 12 is not transferred to the appearance portion 13. Therefore, the communication function of the mobile terminal is not affected.

An embodiment of the present invention further provides a mobile terminal, including the middle frame described above. A circuit board is mounted on a tray, one side of the middle frame is connected to a display apparatus, and the other side is connected to a back cover. The circuit board is used to connect electronic parts and components to form a circuit, so that the display apparatus can present information received by the mobile terminal to a user in a manner of a text and/or a graphic. The back cover is an exterior part, and plays a protection role on the circuit board mounted on the tray and the electronic parts and components to an extent. Production costs of the mobile terminal are relatively low, reliability of the middle frame is relatively high, and lightening and thinning of the mobile terminal device can be implemented.

The middle frame used in the mobile terminal in this embodiment is the same as the middle frame provided in the foregoing middle frame embodiments. Therefore, the two middle frames can resolve a same technical problem, and a same expected effect is achieved.

Another composition and the like of the mobile terminal in this embodiment of the present invention are well known to persons skilled in the art, and are not described herein in detail again.

An embodiment of the present invention further provides a method for producing a middle frame for a mobile terminal, including the following steps:

S1. Internally connect a tray 3 to a metal outer frame 1 by using a location structure 2 to form an insert.

S2. Place the formed insert in an injection molding mold, and form a plastic outer frame 4 on an inner side of the metal outer frame 1 by using an insert injection molding process, so that the plastic outer frame 4 is separately joined with the metal outer frame 1 and the tray 3 for curing.

During production of the middle frame for the mobile terminal, the plate-shape tray 3 is first internally connected to the metal outer frame 1 by using the location structure 2 to form an insert, and the formed insert is then placed into an injection molding mold, the plastic outer frame 4 is formed on an inner surface of the metal outer frame 1 through injection by using the insert injection molding process. After plastic in a molten state is solidified, the plastic can be firmly joined with the metal outer frame 1 and the tray 3 for curing and integration, so as to produce a relatively highly reliable middle frame for the mobile terminal. In addition, the process has simple operations, continuous production can be performed, and quantity production is implemented on the middle frame for the mobile terminal.

To increase a connection closeness degree between the metal outer frame 1 and the plastic outer frame 4, before injection molding and forming are performed on the plastic outer frame 4, nanocrystallization processing further needs to be performed on the inner surface of the metal outer frame 1, so that a plurality of small holes are formed on the inner surface of the metal outer frame 1. Before injection molding and forming are performed on the plastic outer frame 4, nanocrystallization processing is performed on a connection surface between the plastic outer frame 4 and the metal outer frame 1, that is, the inner side of the metal outer frame 1, so that several small holes are formed on the inner surface of the metal outer frame 1. During injection molding and forming of the plastic outer frame 4, plastic in a molten state flows into these small holes. After the plastic outer frame 4 is cooled and formed, the plastic flowing into the small holes is firmly joined together with the small holes. This increases a connection area between the plastic outer frame 4 and the metal outer frame 1, so that connection between the metal outer frame 1 and the plastic outer frame 4 is closer, and no structure disconnection occurs.

To improve aesthetics of the mobile terminal, after the metal outer frame 1, the tray 3, and the plastic outer frame 4 are closely connected together, appearance surfaces of the metal outer frame 1 and the plastic outer frame 4 further need to be processed in a manner of anodizing, spraying, or electrophoresis. After the appearance surfaces are processed, an appearance surface of a produced middle frame is polished to be smooth, or a pattern or the like appears, thereby further improving aesthetics of the mobile terminal.

Finally, it should be noted that the foregoing embodiments are merely intended for describing the technical solutions of the present invention but not for limiting the present invention, Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

The invention claimed is:

1. A middle frame for a mobile terminal, the middle frame comprising:
  a tray;
  a location structure comprising a clamping structure;
  a plastic outer frame; and a metal outer frame, wherein an inner side of the metal outer frame is internally connected to the tray using the location structure, wherein the plastic outer frame is formed on the inner side of the metal outer frame using an insert injection molding process, and wherein the plastic outer frame is separately joined with the metal outer frame and the tray for curing.

2. The middle frame of claim 1, wherein a protrusion is disposed on the inner side of the metal outer frame, wherein the protrusion extends to a middle portion of the metal outer frame, wherein an edge of the tray and the protrusion are disposed in a superposition manner, and wherein the edge of the tray is connected to the protrusion using the location structure.

3. The middle frame of claim 2, wherein the plastic outer frame clamps the tray and the protrusion along a direction of superposition between the tray and the protrusion.

4. The middle frame of claim 2, wherein the protrusion is perpendicular to an inner surface of the metal outer frame.

5. The middle frame of claim 1, wherein the clamping structure comprises at least one first clamping structure disposed on the tray and at least one second clamping structure correspondingly disposed on the metal outer frame, and wherein the at least one first clamping structure is clamped to the at least one second clamping structure in a cooperative manner.

6. The middle frame of claim 2, wherein the clamping structure comprises at least one first clamping structure disposed on the edge of the tray and at least one second clamping structure correspondingly disposed on the protrusion, and wherein the at least one first clamping structure is clamped to the at least one second clamping structure in a cooperative manner.

7. The middle frame of claim 5, wherein:
the first clamping structure is a rivet platform, and the second clamping structure is a rivet hole; or
the first clamping structure is the rivet hole, and the second clamping structure is the rivet platform.

8. The middle frame of claim 7, wherein:
when the rivet platform is disposed on the metal outer frame, a first contact area between the rivet platform and the metal outer frame is greater than or equal to one square millimeter; and
when the rivet platform is disposed on the tray, a second contact area between the rivet platform and the tray is greater than or equal to one square millimeter.

9. The middle frame of claim 1, wherein the metal outer frame comprises a signal receiving portion and an appearance portion, and wherein the plastic outer frame insulatively connects the signal receiving portion and the appearance portion during joining and curing.

10. A mobile terminal, comprising:
a middle frame, comprising:
a tray;
a location structure comprising a clamping structure;
a plastic outer frame; and
a metal outer frame, wherein an inner side of the metal outer frame is internally connected to tray using location structure, plastic outer frame is formed on the inner side of the metal outer frame using an insert injection molding process, and the plastic outer frame is separately joined with the metal outer frame and the tray for curing;

a circuit board mounted on the tray;
a display apparatus; and
a back cover;
wherein one side of the middle frame is connected to the display)apparatus, and the other side of the middle frame is connected to the back cover.

11. The mobile terminal of claim 10, wherein a protrusion is disposed on the inner side of the metal outer frame, wherein the protrusion extends to a middle portion of the metal outer frame, wherein an edge of the tray and the protrusion are disposed in a superposition manner, and wherein the edge of the tray is connected to the protrusion using the location structure.

12. The mobile terminal of claim 11, wherein the plastic outer frame clamps the tray and the protrusion along a direction of superposition between the tray and the protrusion.

13. The mobile terminal of claim 11, wherein the protrusion is perpendicular to an inner surface of the metal outer frame.

14. The mobile terminal of claim 10, wherein the clamping structure comprises at least one first clamping structure disposed on the tray and at least one second clamping structure correspondingly disposed on the metal outer frame, and wherein the at least one first clamping structure is clamped to the at least one second clamping structure in a cooperative manner.

15. The mobile terminal of claim 11, wherein the clamping structure comprises at least one first clamping structure disposed on the edge of the tray and at least one second clamping structure correspondingly disposed on the protrusion, and wherein the at least one first clamping structure is clamped to the at least one second clamping structure in a cooperative manner.

16. The mobile terminal of claim 14, wherein:
the first clamping structure is a rivet platform, and the second clamping structure is a rivet hole; or
the first clamping structure is the rivet hole, and the second clamping structure is the rivet platform.

17. The mobile terminal of claim 16, wherein:
when the rivet platform is disposed on the metal outer frame, a first contact area between the rivet platform and the metal outer frame is greater than or equal to one square millimeter; and
when the rivet platform is disposed on the tray, a second contact area between the rivet platform and the tray is greater than or equal to one square millimeter.

18. The mobile terminal of claim 14, wherein a plurality of first clamping structures are disposed on an edge of one side surface of the tray, and a plurality of second clamping structures corresponding to the plurality of first clamping structures are disposed on the metal outer frame.

19. The mobile terminal of claim 18, wherein the plurality of first clamping structures are disposed at intervals, and wherein a spacing between two adjacent clamping structures of the first clamping structures is between ten millimeters to fifty millimeters.

20. The mobile terminal of claim 10, wherein the metal outer frame comprises a signal receiving portion and an appearance portion, and the plastic outer frame insulatively connects the signal receiving portion and the appearance portion during joining and curing.

* * * * *

UNITED STATES PATENT AND TRADEMARK OFFICE
CERTIFICATE OF CORRECTION

PATENT NO. : 10,652,372 B2
APPLICATION NO. : 16/343299
DATED : May 12, 2020
INVENTOR(S) : Xi Wang et al.

Page 1 of 1

It is certified that error appears in the above-identified patent and that said Letters Patent is hereby corrected as shown below:

In the Claims

Claim 10, Column 12, Line 5: "display )apparatus, and" should read "display apparatus, and"

Signed and Sealed this
Twenty-third Day of June, 2020

Andrei Iancu
*Director of the United States Patent and Trademark Office*